March 24, 1959  A. ZÜRCHER  2,878,990

UPRIGHT PISTON COMPRESSOR

Filed Oct. 30, 1953

INVENTOR:
BY ALFRED ZÜRCHER.
ATTORNEY.

United States Patent Office 2,878,990
Patented Mar. 24, 1959

2,878,990

UPRIGHT PISTON COMPRESSOR

Alfred Zürcher, Winterthur, Switzerland, assignor to Sulzer Freres Societe Anonyme, Winterthur, Switzerland, a corporation of Switzerland Application October 30, 1953, Serial No. 389,335

2 Claims. (Cl. 230—172)

The invention relates to an upright piston compressor whose piston is so guided outside of the cylinder that the piston does not contact the interior wall of the cylinder. This is achieved by providing two chambers between the piston and the crosshead which serves as a first guide for the piston rod, the chambers being separated by a wall supporting a second guide for the piston rod.

Aside from the second piston rod guide, the wall separating the two chambers may support a device for wiping the oil from the piston rod. The chamber which is proximal of the piston may be closed and may communicate with a low pressure chamber of the compressor. The chamber which is proximal of the crosshead may also be closed and may communicate with the crankcase. The latter may also be closed, having only an opening for the crankshaft.

It is recommended to extend the crankshaft through an oil-seal-chamber to the outside. This oil-seal-chamber may have two stuffing boxes, one for preventing escape of oil from the sealing chamber along the crankshaft to the outside and the other stuffing box serving for preventing escape of oil from the oil-seal-chamber through the adjacent bearing. An oil supply conduit and a pressure maintaining valve is preferably connected with the upper part of the sealing chamber so that an excess pressure is maintained in the sealing chamber. The oil-seal-chamber is preferably connected with the lubricating conduit of the crank mechanism.

The novel features which are considered characteristic of the invention are set forth with particularity in the appended claims. The invention itself, however, and additional objects and advantages thereof will best be understood from the following description of an embodiment thereof when read in connection with the accompanying drawing in which:

Figure 1:
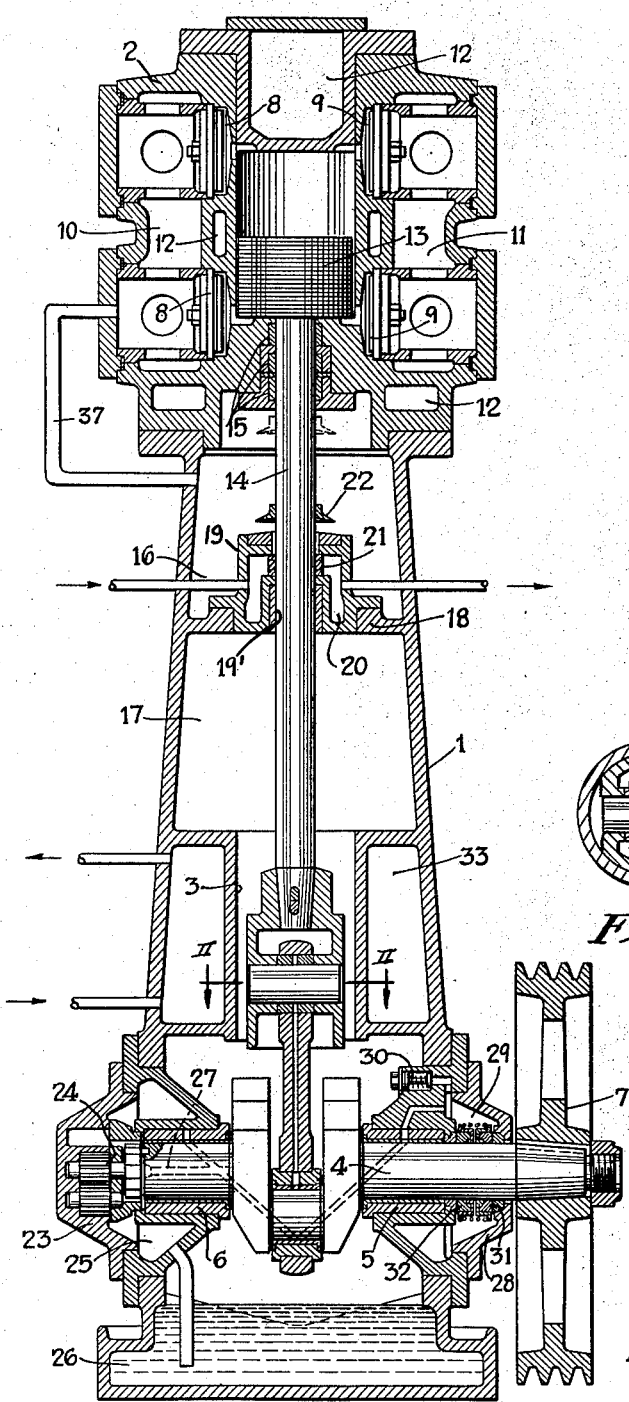
Fig. 1 is a diagrammatic longitudinal sectional view of a compressor according to the invention.
Figure 2:
Fig. 2 is a horizontal sectional view of the crosshead and crosshead guide of the compressor shown in Fig. 1, the section being made along line II—II in Fig. 1.

The compressor comprises a frame 1 and a cylinder 2. The frame includes a conventional crankcase and a crosshead guide 3. A crankshaft 4 is supported by bearings 5 and 6 and has an extension carrying a fly wheel 7 outside of the frame 1. Each half of the cylinder 2 is provided with a suction valve 8 and a pressure valve 9, the suction valves communicating with a suction chamber 10 and the pressure valves with a pressure chamber 11. The cylinder 2 is provided with cavities 12 for receiving a coolant for removing the heat generated by the compression. A piston 13 is connected with the upper end of a piston rod 14 and is provided at its circumference with labyrinth grooves. The diameter of the piston is somewhat smaller (about 2 to 3 mm.) than the diameter of the cylinder. The interior wall of the clyinder is also provided with fine labyrinth grooves. During normal operation the piston is so guided that it does not contact the cylinder wall. Sealing between the cylinder spaces at the ends of the piston is exclusively effected by the labyrinth grooves. Three labyrinth packings 15, which are radially movable, serve for sealing the piston rod against the cylinder. The packings 15 are preferably made of graphite and have a radial clearance with respect to the piston rod of about $\frac{1}{10}$ mm. Thus the piston rod is free to move laterally in the cylinder bottom.

Two chambers 16 and 17 are arranged between the piston 13 and the crosshead guide 3 which chambers are separated by a wall 18. The latter supports a guide 19 having a bearing surface 19' in which the piston rod is guided without a substantial clearance. Lubrication is effected by dropwise supply of lubricating oil by conventional means, not shown. If desired, a coolant chamber 20 may be provided in the guide 19 for removing heat generated by friction. Resilient oil wiping rings 21 may be provided on top of the guide 19 for preventing penetration of the oil adhering to the rod 14 from chamber 17 to chamber 16. A guard ring 22, fast on the piston rod 14, prevents creeping up on the piston rod of the oil which has not been wiped off. The piston rod is dry above the guard ring 22 so that no oil can enter the operating space in cylinder 2.

Depending on the nature of the substance to be compressed, the chamber 16 may be open or closed. If the compressor is used for oxygen or air, chamber 16 need not be closed since escaping gases are not dangerous. If unhealthy or poisonous gases, or if gases are compressed which are harmful to the construction materials of the compressor, chamber 16 is closed and connected with a chamber of reduced compression pressure, so that leakage gas is returned to the compressor circuit. In the embodiment of the invention illustrated in the drawing, the chamber 16 communicates with the suction chamber 10 through a conduit 37. Suction means may be provided on the piston rod guide formed by the labyrinth packings 15 and chamber 16 may be left open without departing from the scope of the present invention. A sealing gas may be introduced under pressure into the space between the labyrinth packings 15 for preventing escape of compressed gas into the chamber 16 and into the atmosphere. The chamber 17 is preferably closed for preventing loss of oil. This chamber serves primarily for catching oil coming from the guide 3 and from from the crankcase.

The crankcase is closed, primarily for preventing loss of oil and secondarily for preventing escape of gas which may enter the crankcase through chambers 16 and 17 and through the crosshead guide 3. The bearing shield 23 supports a gear pump 24 drawing oil from sump 26 through chamber 25 and supplying it through bores 27 in the crankshaft to the bearings, the crosshead and to a sealing chamber 29 in the bearing shield 28. At the end of the described oil path is a pressure maintaining valve 30 which maintains an oil pressure of, for example, 3 to 4 atmospheres. Supply and discharge of the oil is effected in the upper portion of the sealing chamber 29. Two pairs of packing rings 31 and 32 are provided on the shaft 4 for preventing escape of oil from the sealing chamber to the fly wheel 7 and to the bearing 5. The sealing chamber is therefore filled with oil not only during normal operation but also during the idle periods of the compressor so that no gas can escape when the compressor stands still.

Piston 13 is securely guided by the crosshead guide 3 and the guide 19. The piston rod must be accurately guided in both guides which must have as little clearance as possible. If too much heat is generated in the guides due to friction, the excess heat may be removed by a coolant circulating in cavities 20 and 33. Chamber 16 may be connected with chamber 17 by a small bore in the separating wall 18 to remove oil accumulated in chamber 16. Chamber 17 may be connected by special conduits with the crankcase, facilitating removal of oil which may have accumulated in chamber 17. These conduits preferably extend through the chamber 33.

The invention can be applied to a single acting compressor. In this case the packing rings 15 are omitted and the lower cylinder space communicates with the chamber 16. Under certain circumstances, the guard ring or shield 22 may be omitted so that the height of chamber 16 can be reduced and the piston 13 can be closer to the two piston rod guides. If gases of very low temperature are compressed, the cylinder need not be cooled and the chambers or cavities 12 serve for insulating the cylinder. The construction material of the cylinder, the piston, and the piston rod must suit the nature of the gases to be compressed. The piston rod must be polished to have a smooth surface without pores to prevent creeping up of oil from the crankcase to the cylinder. In many cases nitrated steel is advantageously used as construction material for the piston rod. A compressor according to the invention may be in upright or inclined position, the crankcase, however, must always be at a lower level than the cylinder. The invention can also be applied to compressors having a plurality of pistons.

I claim:

1. In an upright piston compressor a frame, a cylinder connected with said frame and having an interior wall, a piston reciprocable in said cylinder and being spaced from and unguided by said interior wall, a piston rod, a crosshead connected with the lower end of said piston rod, a crosshead guide connected with said frame, an upper chamber and a lower chamber formed by said frame between said cylinder and said crosshead guide and above the latter, a separating wall between said chambers, said wall being at least one third of the distance between said crosshead guide and said cylinder above said crosshead guide, and an additional positive guide for said piston rod arranged in said separating wall, said additional guide including a bearing surface of substantial length closely engaging and laterally supporting said piston rod for positively guiding said piston rod and centering said piston in said cylinder.

2. In an upright piston compressor as defined in claim 1, oil wiping means disposed in said frame above said bearing surface.

References Cited in the file of this patent
UNITED STATES PATENTS

| | | |
|---|---|---|
| 1,233,438 | Barengueras | July 17, 1917 |
| 1,375,376 | Flynn | Apr. 19, 1921 |
| 1,428,473 | Chew et al. | Sept. 5, 1922 |
| 1,557,706 | Knox | Oct. 20, 1925 |
| 1,633,699 | Halleck | June 28, 1927 |
| 1,937,859 | Thomas | Dec. 5, 1933 |
| 2,109,541 | Valley | Mar. 1, 1938 |
| 2,204,374 | Metzgar | June 11, 1940 |
| 2,468,509 | Naab | Apr. 26, 1949 |
| 2,765,976 | Stewart | Oct. 9, 1956 |